United States Patent [19]

Gardner

[11] 4,169,319

[45] Oct. 2, 1979

[54] METHODS AND APPARATUS FOR MEASURING THE THICKNESS OF WET FILMS

[75] Inventor: Paul N. Gardner, Pompano Beach, Fla.

[73] Assignee: Paul N. Gardner Company, Fort Lauderdale, Fla.

[21] Appl. No.: 940,299

[22] Filed: Sep. 6, 1978

[51] Int. Cl.² .............................................. G01B 5/18
[52] U.S. Cl. ................................................. 33/169 F
[58] Field of Search ............. 33/169 R, 169 B, 169 F, 33/168; 73/150

[56] References Cited

U.S. PATENT DOCUMENTS

| | | | |
|---|---|---|---|
| 2,507,592 | 5/1950 | Euverard | 33/169 F |
| 2,814,122 | 11/1957 | Euverard | 33/169 F |
| 3,396,472 | 8/1968 | Moss | 33/199 A |

FOREIGN PATENT DOCUMENTS

| | | | |
|---|---|---|---|
| 64680 | 5/1914 | Austria | 33/141 E |
| 685238 | 12/1952 | United Kingdom | 33/169 F |

*Primary Examiner*—Harry N. Haroian
*Attorney, Agent, or Firm*—Burns, Doane, Swecker & Mathis

[57] ABSTRACT

A gauge for measuring the thickness of a wet film on a surface comprises a circular disc having circumferentially spaced, calibrated notches around the outer periphery thereof. Finger grip elements are disposed at opposite sides of the disc and carry the disc for rotation relative thereto. The disc is rolled across the surface relative to the finger grip elements so that the notches are selectively wetted.

7 Claims, 9 Drawing Figures

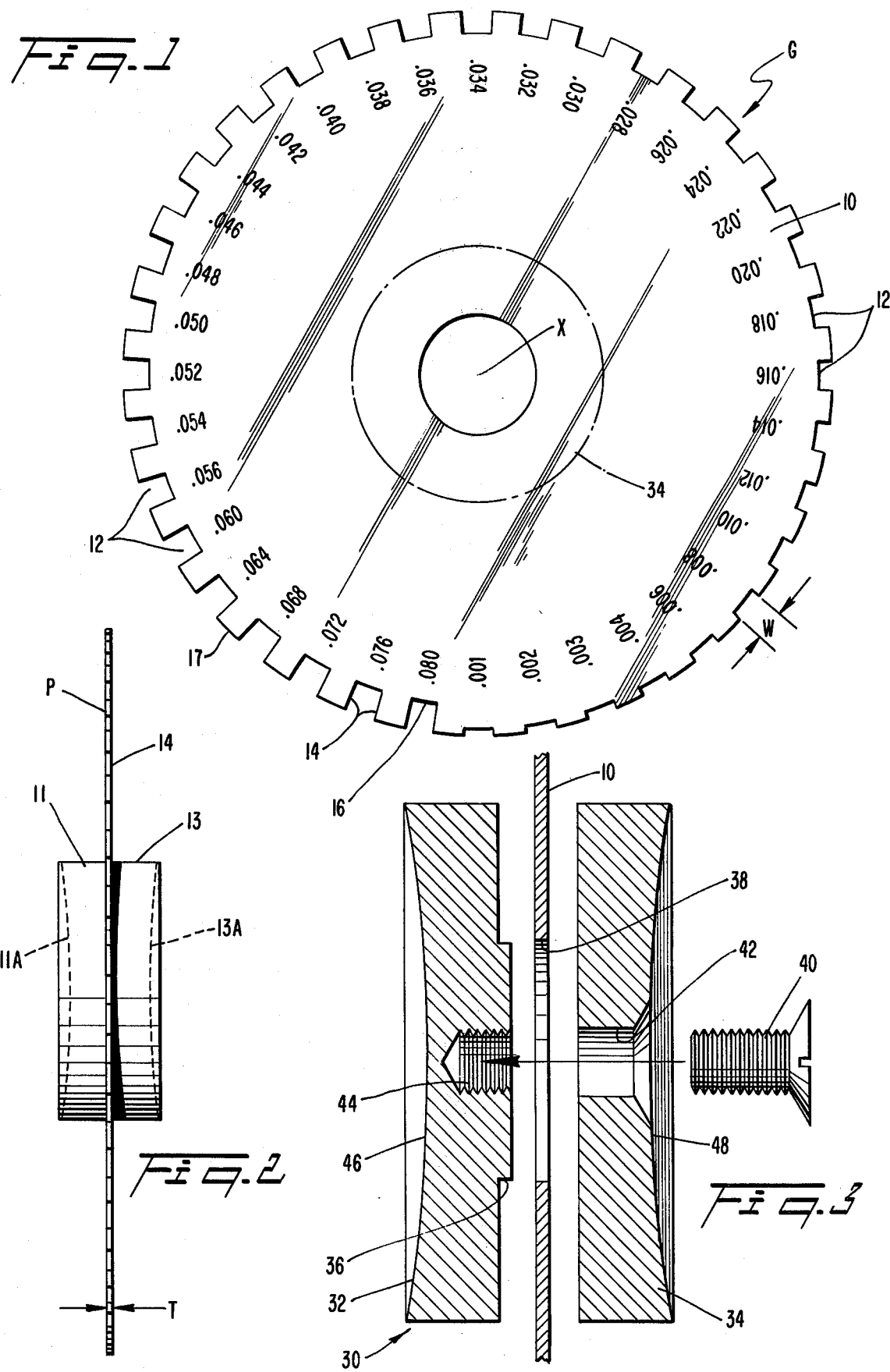

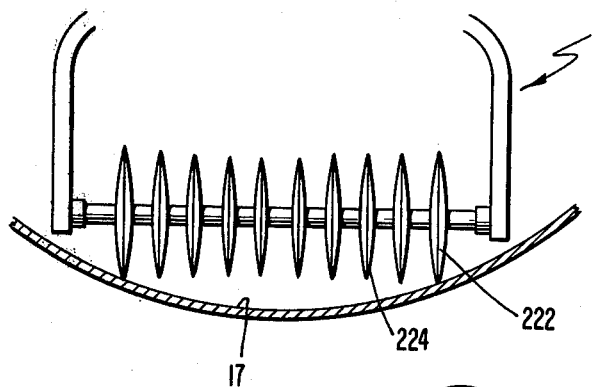
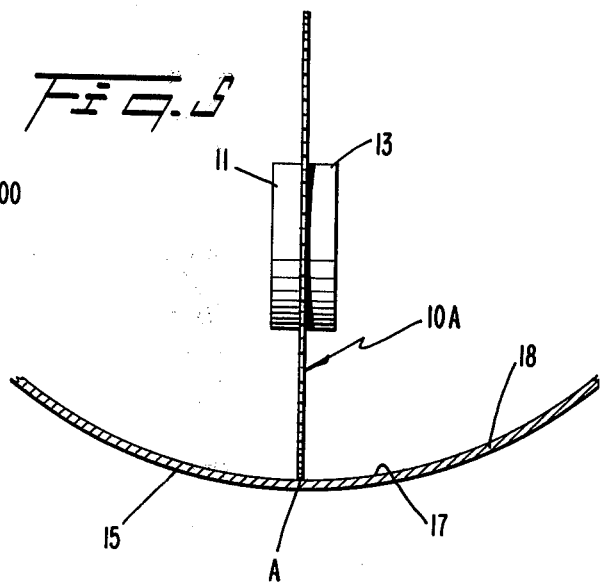
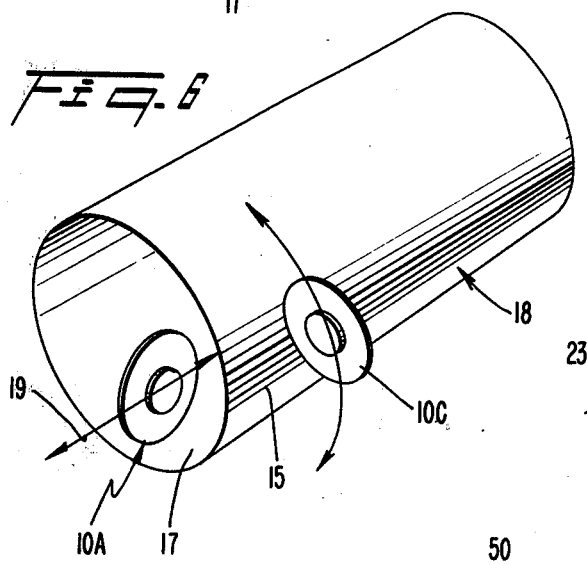
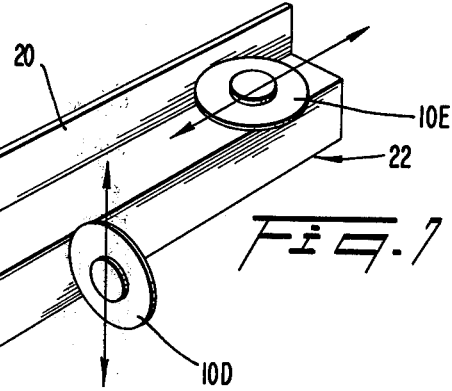
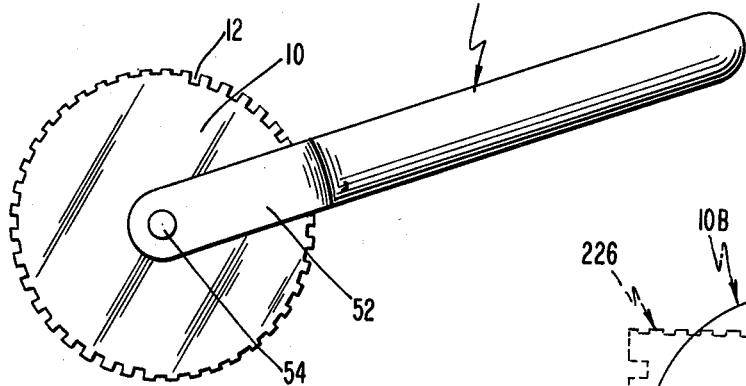
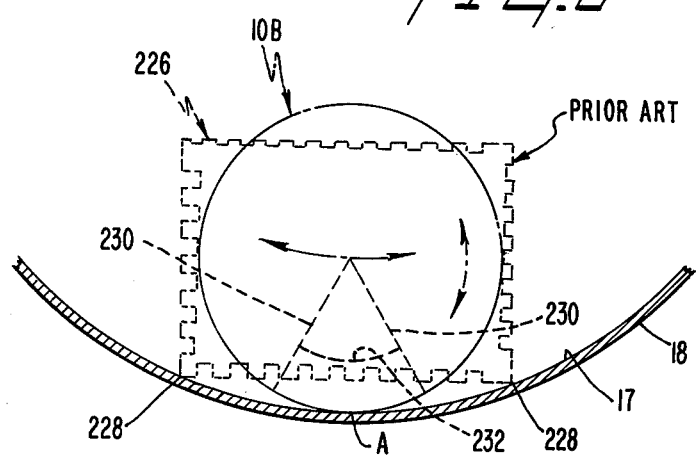

METHODS AND APPARATUS FOR MEASURING THE THICKNESS OF WET FILMS

BACKGROUND AND OBJECTS OF THE INVENTION

The present invention relates to method and apparatus for measuring the thickness of wet coatings or films.

It is often necessary to determine the thickness of a fluid or semi-fluid coating, i.e., so-called "wet film", on the surface of various objects such as inking rolls, paint mill rolls, I-beams, tubular ducts (inside and outside surfaces) and many other objects having flat, angled, or curvalinear surfaces.

Gauges have heretofore been proposed for measuring the thickness of wet films, as evidenced for example, by U.S. Pat. No. 2,167,652 issued to Hoch on Aug. 1, 1939; U.S. Pat. No. 2,507,592 issued to Euverard on May 16, 1950; U.S. Pat. No. 2,675,623 issued to Lewis et al on Apr. 20, 1954; U.S. Pat. No. 2,839,835 issued to Zollinger on June 24, 1958; U.S. Pat. No. 3,019,645 issued to Lake on Feb. 6, 1962; and British Pat. No. 685,238 issued to Scott on Dec. 31, 1952.

Such gauges are designed to roll along a film-containing surface in order to measure the thickness of the film. More particularly, a pair of surface-contacting rollers are mounted on a rotary axle. Between the rollers a thickness measuring structure is positioned which can be in the form of radially projecting pegs or an eccentrically mounted annular rib, for example, which are calibrated so as to present faces to be wetted. The pegs or ribs present faces which are located at different distances from the outer diameter of the rollers. By rolling the gauge across the surface, the faces situated above the level of the film will not be wetted, while those faces at or below such level will be wetted. The operator need only thereafter inspect the gauge and take the reading of that wetted face located the greatest distance from the periphery of the rollers.

Gauges have also been proposed which are in the form of thin polygonal plates (e.g., rectangular plates) having calibrated notches around the outer peripheral sides. By laying one edge of the plate on the surface to be measured, the measurement can be made by thereafter examining the gauge to identify the deepest notch whose inner end face has been wetted.

Although gauges of the aforementioned type can provide accurate measurement on flat surfaces, they may not be able to perform adequately on curved surfaces due to the span between the surface-engaging portions of the gauge. For example, if a gauge having axially spaced rollers is rolled along an internal or external surface of a curved duct in a direction parallel to the axis, the rollers will engage portions of the surface which are higher than the intermediate portion of the surface which is being measured. Hence, the calibrated measuring structure will be located too high to take an accurate reading. Similarly, if a polygonal plate-type gauge is laid upon such a surface such that the plane of the plate is disposed perpendicular to the axis of the curved surface, the end edges of one side of the plate will contact the surface at locations above that portion of the surface to be measured by notches on such side. Hence, accurate readings are not possible.

It is, therefore, an object of the present invention to eliminate or minimize problems of the above-captioned type.

It is another object of the invention to provide novel methods and apparatus for measuring the thickness of wet films.

It is yet another object of the invention to enable the thickness of wet films to be accurately measured on surfaces of virtually any shape.

It is still another object of the invention to provide a novel gauge which comprises a thin circular plate having calibrated notches around the outside periphery thereof.

It is a further object of the invention to provide a novel method of measuring the thickness of a wet film wherein an annular plate having calibrated notches around the outside periphery thereof is rolled along the surface being measured.

BRIEF SUMMARY OF THE INVENTION

These objects are achieved by the present invention in which a wet film gauge comprises a plate having a plurality of circumferentially spaced, calibrated measuring means, such as notches for example, around a curved outer periphery thereof. The plate is rotatable so that the measuring means can travel through the film and become wetted thereby to measure the thickness thereof.

THE DRAWING

Other objects and advantages of the invention will become apparent from the following detailed description of a preferred embodiment thereof in connection with the accompanying drawings in which like numerals designate like elements, and in which:

FIG. 1 is a side elevational view of a gauge according to the present invention;

FIG. 2 is an end view of a gauge according to the present invention which includes finger grips;

FIG. 3 is an enlarged end view of a center section of a gauge depicting one form of finger grip arrangement;

FIG. 4 is an end view of a prior art gauge disposed in position to be rolled along a curved surface in a direction parallel to the axis of the surface;

FIG. 5 is a view similar to that of FIG. 4 of a gauge according to the present invention in position to be rolled along such surface in the same direction;

FIG. 6 is a perspective view depicting the manner in which a gauge according to the present invention can be rolled along inner and outer surfaces of a hollow tube to take wet film measurements;

FIG. 7 is a perspective view depicting the manner in which a gauge according to the present invention can be rolled along flat surfaces of an angled member, and along an angle formed by two sides of such member, to measure a wet film thickness thereon;

FIG. 8 is a side view of a gauge according to the present invention being rotatably carried by a handle-type support; and FIG. 9 is a side view of a gauge according to the present invention in a position to be rolled in a circumferential direction along a concave surface, and in phantom lines, a prior art plate-type gauge in position to take a measurement on the same surface.

DETAILED DESCRIPTION OF A PREFERRED EMBODIMENT OF THE INVENTION

A gauge 6 according to the present invention comprises a plate in the form of a thin circular disc formed of any desired material such as plastic or metal, for example. The disc 10 contains a plurality of thickness measuring notches 12 arranged in circumferentially spaced relationship around the outer periphery of the disc. Each notch includes side walls 14 and an end wall 16. The notches are calibrated i.e., are of progressively increasing or decreasing depth, to form a scale extending from a lowest value to a highest value. A radially outer end of a side wall 14 of each notch is circumferentially spaced from the radially outer end of the nearest side wall of an adjacent notch to form a circumferentially extending face 17 between adjacent notches.

It will be appreciated that while the important parameters of the gauge such as diameter, thickness, and width and depth of notches can vary, the disc is to be very thin, preferably having a thickness T in the range of from about 0.032 to about 0.125 in. The width W of the notches, i.e., spacing between side walls 14, is preferably in the range of from about one-sixteenth inch to one-eighth inch. The diameter of the disc is preferably in the range of from 1 to 3 in.

In one preferred embodiment a three inch diameter disc formed of aluminum has a thickness T of 0.0625 in. and notches having a width W of 0.125 in. The notches are formed by a conventional stamping process.

In use, the disc 10 can be gripped on opposite sides by the thumb and index finger of the operator and rolled about its longitudinal axis across the surface being measured.

To facilitate gripping of the disc 10, a pair of grip elements 11, 13 may be connected thereto, which include curved gripping surfaces 11A, 13A to enable the thumb and forefinger of the operator to conveniently hold the disc (see FIG. 2).

Due to the curved and thin nature of the outer periphery of the disc, the contact area A (FIG. 5) between the disc and the surface is extremely small, enabling the disc to take measurements along virtually any type of curvalinear surface, so long as the radius of curvature of the surface is greater than that of the disc.

Thus, for example, a disc 10A according to the present invention (notches 12 not illustrated) can take measurements along the internal concave surface 17 of a circular duct 18 in a direction 19 parallel to the axis of the duct, as depicted in FIGS. 5 and 6. In contrast, a prior art type of gauge 200 is depicted in FIG. 4 wherein a pair of axially spaced guide wheels 222 and intermediate calibrated wheels 224 are provided, indicating that the calibrated wheels are positioned too high above the surface 17 to take accurate measurements in a similar direction.

In FIG. 9 it is depicted how a gauge 10B according to the present invention (notches 12 not illustrated) can be displaced along the internal surface of the duct 18 in a circumferential direction to take accurate measurements. In phantom lines in FIG. 9, there is depicted a gauge 226 of the prior art rectangular plate-shaped type as it would be disposed to take a similar reading within the duct 18. As will be understood, contact between the ends 228 of the long-sided plate 226 engage the surface 17 in a manner positioning the notched side of the plate too high to take accurate measurements.

In FIG. 6 a gauge 10C according to the present invention is depicted in position to measure a film on the outer periphery 15 of the duct 18 in a circumferential direction.

In FIG. 7, gauges 10D and 10E according to the present invention are illustrated taking measurements along flat sides 20, 21 of an angular member 22, and a gauge 10F according to the present invention is depicted taking a measurement along an angle formed by the surfaces 21, 23 of the member 22.

The gauge of the present invention, then, is able to take accurate readings in virtually any direction on curved or flat surfaces. Thus, the thickness of a wet film can be measured on printing rolls, golf balls, I-beams, and along the edges of folded or bent objects, just to name a few of the possible applications.

The notches 12 can be calibrated to form a single scale ranging from a smallest to a largest value, as depicted in FIG. 1, or to form two scales arranged consecutively so that two measurements can be made with a single roll of the gauge, as depicted in FIG. 8.

Although the gauge 10 can be rolled while being held at its center directly between the fingers of an operator, the present invention envisions a rotary journal 30 support for the gauge.

In FIG. 3, a preferred rotary journal arrangement 30 is disclosed which comprises a pair of finger grip elements 32, 34. One of the finger grip elements 32 includes an integral washer 36 which is adapted to extend through a central hole 38 in the disc 10. A bolt 40 extends through an aperture 42 in the other finger grip element and is threadedly connected within a threaded recess 44 in the one finger grip element 32. The finger grips 32, 34 include concave gripping faces 46, 48 which can be comfortably gripped by the thumb and forefinger of a user. The washer 36 and grip elements 32, 34 are arranged for loose engagement with the disc 10 so that the latter may rotate freely relative thereto. The finger grips 32, 34 can be formed of any suitable material such as metal or plastic, for example.

In operation, the finger grips 32, 34 are held between two fingers of the operator's hand, preferably the thumb and forefinger, with the disc 10 being placed in contact with a surface which carries a film to be measured. The finger grips are then advanced in a manner causing the disc to rotate relative to the finger grips along the surface, whereby calibrated notches 12 thereon are wetted to provide a measurement of the film thickness.

Other suitable arrangements of the finger grip assembly are possible, so long as the disc 10 is able to rotate relative thereto, thereby eliminating rotation of the grip elements.

In lieu of finger grips, a handle 50 can be mounted to the disc in order to enable the disc to be inserted into hard-to-reach areas (see FIG. 8). Such a handle 50 can be of a conventional nature and includes a yoke 52 having a pair of legs 54 (one leg 54 depicted in FIG. 8) which are connected to an axle pin 56 on which the disc 10 is rotatably mounted.

Instead of comprising a circular disc, the gauge according to the present invention could comprise a segment of a circle or simply a plate having a curvalinear periphery with a given number of notches spaced therealong. In FIG. 9 broken radial lines 230 indicate the manner in which a circular plate 10B could be cut to form a segment, and the broken line 232 indicates the manner in which yet a smaller member could be formed from a segment by eliminating the central portion of the segment. Both members operate in accordance with the present invention in that they are rolled, or rocked, along the surface so that the notches on the periphery sequentially enter the film to measure the thickness thereof.

SUMMARY OF MAJOR ADVANTAGES

It will be appreciated that the gauge according to the present invention produces a minimal area of contact with the surface being measured, thereby enabling the gauge to take measurements on surfaces of virtually any shape. The novel finger grip arrangement facilitates an effective rolling movement of the disc portion of the gauge across a surface being measured.

Although the invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A gauge for measuring the thickness of a wet film on a surface, comprising a substantially circular disc having a thickness in the range of from 0.032 to 0.125 inches, said disc including a plurality of circumferentially spaced, calibrated measuring notches disposed around the outer periphery thereof, said notches each including a pair of generally radially extending side walls and a generally circumferentially extending end wall connecting radially inner ends of said side walls, radially outer ends of said side walls extending to the outer periphery of said disc and being spaced apart to form an open end of each notch, the radially outer end of a side wall of each notch being circumferentially spaced from the radially outer end of the nearest side wall of an immediately adjacent notch to form a generally circumferentially extending face between such adjacent notches, the depths of said notches being graduated, said disc being rotatable about a central axis thereof along the film-containing surface so that at least some of said measuring notches travel through the film and become wetted thereby to measure the film thickness.

2. A gauge according to claim 1, wherein the thickness of said disc is substantially 0.062 in.

3. A gauge according to claim 1, wherein said notches are calibrated to form a single scale from a lowest value to a highest value.

4. A gauge according to claim 1, wherein said notches are calibrated to form two identical consecutively arranged scales each extending from a lowest value to highest value.

5. A gauge according to claim 1, further including a pair of finger grip elements mounted coaxially on opposite sides of said disc, said elements carrying said disc for rotation relative thereto.

6. A gauge according to claim 5, wherein said finger grip elements each include a concave surface for being gripped by a finger of an operator.

7. A method of measuring the thickness of a wet film on a surface comprising the steps of:

provideing a substantially circular disc having a thickness in the range of from 0.032 to 0.125 inches, said disc including a plurality of circumferentially spaced, calibrated measuring notches disposed around the outer periphery thereof, said notches each including a pair of generally radially extending side walls and a generally circumferentially extending end wall connecting radially inner ends of said side walls, radially outer ends of said side walls extending to the outer periphery of said disc and being spaced apart to form an open end of each notch, the radially outer end of a side wall of each notch being circumferentially spaced from the radially outer end of the nearest side wall of an immediately adjacent notch to form a generally circumferentially extending face between such adjacent notches, the depths of said notches being graduated, and rolling said disc across said surface such that said faces contact said surface and at least some of said notches become wetted by the film to provide a measurement of the thickness thereof.

* * * * *